A. DOLL & C. ELLING.
Faucets.

No. 144,516. Patented Nov. 11, 1873.

Witnesses.

Inventors.
A. Doll and C. Elling.
Per Burridge & Co.
Attys.

UNITED STATES PATENT OFFICE.

ARNOLD DOLL AND CHARLES ELLING, OF CLEVELAND, OHIO.

IMPROVEMENT IN FAUCETS.

Specification forming part of Letters Patent No. 144,516, dated November 11, 1873; application filed September 29, 1873.

*To all whom it may concern:*

Be it known that we, ARNOLD DOLL and CHARLES ELLING, both of Cleveland, in the county of Cuyahoga and State of Ohio, have invented a certain new and Improved Faucet, of which the following is a full, clear, and complete description, reference being had to the accompanying drawings, making part of the same.

Figure 1:
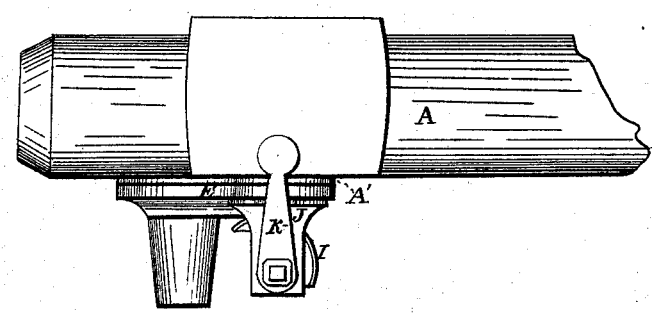
Figure 2:
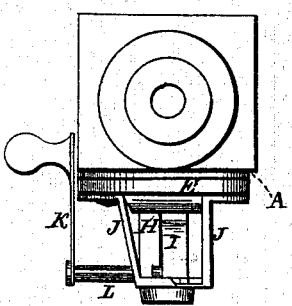
Figure 3:
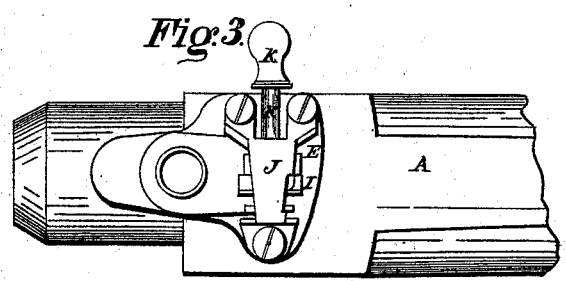
Figure 4:
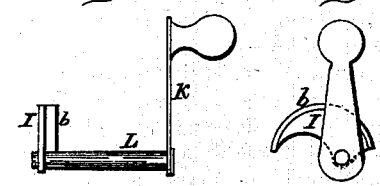
Figure 5:
Figure 6:
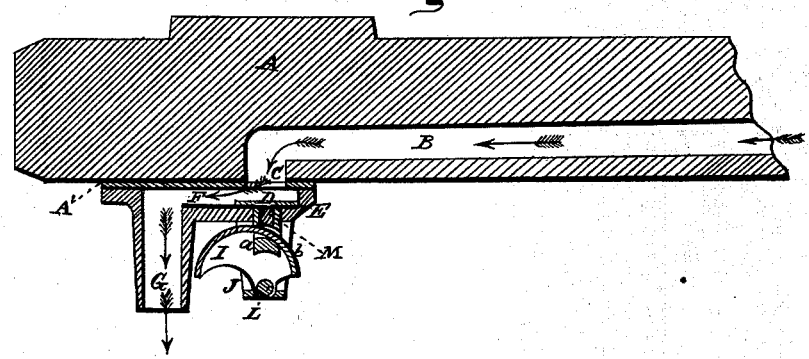

Figure 1 is a side view of the faucet. Fig. 2 is an end view. Fig. 3 is a view of the under side. Figs. 4 and 5 are detached sections. Fig. 6 is a longitudinal section.

Like letters of reference refer to like parts in the several views.

The nature of this invention relates to a faucet, and the special object thereof is to dispense with the use of the ordinary plug or key, substituting therefor a valve operated by a cam, the construction and operation of which are as follows:

In the drawing, A indicates the stem or body of the faucet, which is or may be of the ordinary shape, and of any desirable material. B is the bore or conduit, the opening C of which is closed by a valve, D, Fig. 6. Said valve has its seat in the plate E, attached to the side of the stem of the faucet. A recess, F, Fig. 6, in the plate forms a continuation of the conduit B to the outlet or nozzle G. The stem $a$ of the valve is fitted to and slides in a guide, H, depending from the plate, and which is operated for opening and closing the way C by a cam, L. From the side of the cam projects a flange, $b$. Said flange is fitted in a notch cut in the side of the valve-stem, and which slides therein for operating the valve. The cam is pivoted in the cheeks of a stay, J, Figs. 2 and 3, and is actuated for operating the valve by a crank, K, attached to the shaft L. (Detached views of said cam-shaft and crank are shown in Figs. 4 and 5.) Between the plate E and the side of the faucet to which it is secured is interposed a leather packing, A', for making tight the attachment of the plate to the faucet, and also to form a soft surface on which the face of the valve may rest when the opening C is closed thereby.

The operation of the above-described faucet is simple and apparent. The position of the valve, as shown in Fig. 6, is such as when it is open for draft, the fluid flowing out therefrom, as indicated by the arrows. In order to stop the flow, the opening C is closed by the valve, which is pushed upward by the cam operated by the handle K. The rim of the cam presses upon the end of the stem of the valve, or on the upper side of the notch therein, in which the flange $b$ is received, as above described. The face of the valve closes over the opening, and the soft package of leather prevents leakage. Around the valve-stem is placed an elastic pipe, M, or other packing of any suitable material, which packs the stem and prevents the escape of fluid around it.

By this arrangement all the operating parts for opening and closing the valve are upon the outside of the faucet, which renders them easily accessible for repairs, and convenient to be kept in order, and for other purposes. The operating devices being on the outside, they do not interfere with the movement of the valve, and are not in contact with the fluids to produce oxidation.

What we claim as our invention, and desire to secure by Letters Patent, is—

The cam I, valve D, plate E, provided with a recess, F, and outlet G, all constructed and arranged to operate as described, in combination with the body A of the faucet, substantially as and for the purpose set forth.

ARNOLD DOLL.
CHARLES ELLING.

Witnesses to signature of ARNOLD DOLL:
F. GATTERDAM,
J. KRAUSE.

Witnesses to signature of CHARLES ELLING:
W. H. BURRIDGE,
A. F. CORNELL.